Apr. 17, 1923.
B. C. RODENHIZER
WATER GAUGE GLASS FOR STEAM BOILERS
Filed Feb. 19, 1921
1,452,390
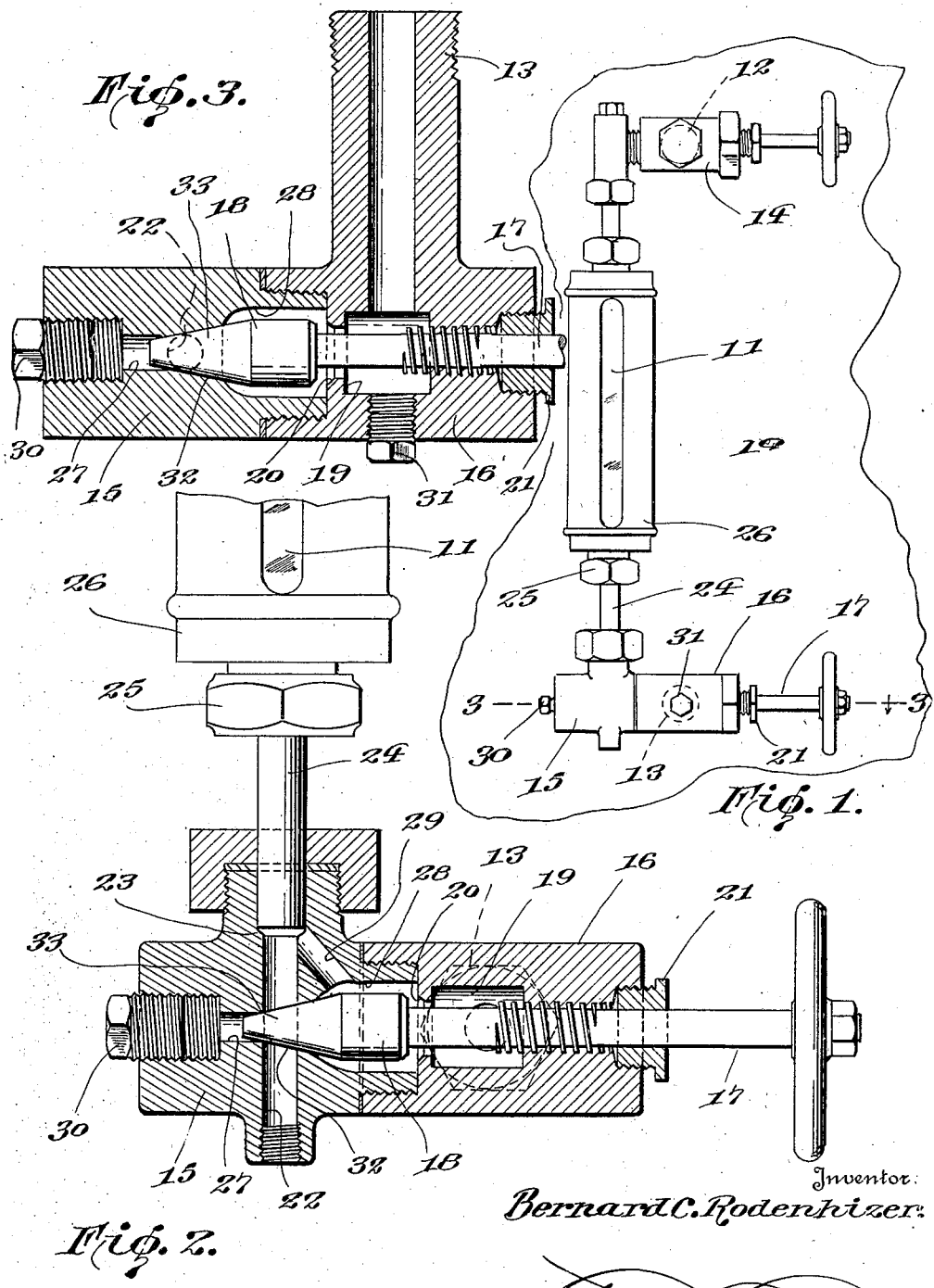
Inventor:
Bernard C. Rodenhizer
By [signature]
Attorneys.

Patented Apr. 17, 1923.

1,452,390

UNITED STATES PATENT OFFICE.

BERNARD C. RODENHIZER, OF LYNCHBURG, VIRGINIA.

WATER-GAUGE GLASS FOR STEAM BOILERS.

Application filed February 19, 1921. Serial No. 446,229.

*To all whom it may concern:*

Be it known that I, BERNARD C. RODENHIZER, a citizen of the United States, residing at Lynchburg, in the county of Campbell, State of Virginia, have invented certain new and useful Improvements in Water-Gauge Glasses for Steam Boilers; and I do hereby declare the following to be a full, clear, and exact description of the invention, such as will enable others skilled in the art to which it appertains to make and use the same.

This invention relates to new and useful improvements in water gauges and particularly to water gauge glasses for steam boilers, of the locomotive type.

The principal object of the invention is to provide a water gauge glass for steam boiler and the valves associated therewith by means of which the water may be quickly drained from the glass for the purpose of preventing the assumption, on the part of the engineer that there is a sufficient quantity of water in the boiler.

Ordinarily, when a water gauge glass cracks, and the valves are closed, a quantity of water remains in the glass tube, with the result that the engineer will assume that he has that level of water in the boiler and will go out on his run. But, as a matter of fact, the water level in the boiler is very low, and in a very short time is exhausted into steam, and an explosion occurs. With the present device, when the valves are closed, in the event that the glass is cracked or broken, the water will be automatically drained, and none whatever remain in the glass, so that the engineer will have no reason to assume that he has sufficient water in the boiler.

Another object is to provide a water gauge glass of such construction that the broken glass may be easily and quickly removed, and a new one placed therein, without danger of escaping steam burning the operator.

Other objects and advantages will be apparent from the following description when taken in connection with the accompanying drawing.

In the drawing:

Figure 1 is a side elevation of the improved water gauge glass and valves.

Figure 2 is an enlarged vertical longitudinal sectional view through the lower valve of the water gauge glass.

Figure 3 is a horizontal longitudinal central sectional view through the lower valve, on the line 3—3 of Figure 1.

Referring particularly to the accompanying drawing, 10 represents a portion of a boiler, with which the water gauge glass 11 is associated. Connected to the side of the boiler by means of the nipple 12 is the valve casing 14, said casing being the upper valve of the glass as shown in the drawing. The upper valve is of the ordinary construction and does not need any detailed description, as the invention has to do particularly with the lower valve. The lower valve includes a casing 15 on one end of which is screwed the cap or bonnet 16 and receives threadedly therethrough the valve stem 17, said stem having the valve head 18, on its inner end. From one side of the bonnet extends the nipple 13 which is engaged in the boiler wall in the usual way to have its passage in communication with the interior of the boiler. At the inner end of the bonnet is formed a chamber 19 into which is conveyed water from the boiler through the nipple 13, the inner wall of said chamber being formed with the ground seat 20 for the beveled end of the valve head 18. A packing nut 21 is engaged in the outer end of the bonnet and receives the stem 17 therethrough.

Formed vertically through the valve casing 15 is a passage 22 which has its upper portion slightly enlarged in diameter to form the shoulder or seat 23, against which the lower end of the metal pipe or tube 24 is arranged to be seated. This pipe carries the usual nut and nipple 25 for connection with the lower end of the casing or cage 26 of the glass 11. Formed through the casing 15, and intersecting the passage 22, at right angles, is a passage 27, the inner end of which is enlarged and flared toward the bonnet, as shown at 28, which forms, in effect a chamber communicating with the chamber 19 through the seat 20. The chamber 28 communicates with the passage 22 by means of the short inclined passage 29.

In the outer end of the passage 27 is engaged a removable plug 30, while a removable plug 31 is engaged in the side of the bonnet at a point directly opposite the inner end of the passage of the nipple 13. By removing these plugs 30 and 31, a wire may be readily passed through the passages 22 and the nipple 13, to permit removal of scale and mud.

At the intersection at the passages 22 and 27, there is formed a tapered seat 32 against which is seated the tapered end 33 of the valve head 18.

It will be noted that the lower end of the passage 22 opens through the bottom of the casing 15, thus forming a drain so that when the valve is unseated from the seat 32 the water in the glass 11 may quickly drain to the ground. This lower end of the passage 22 is arranged to remain open at all times so that the glass may quickly empty itself of water when the valve head is unseated.

In the operation of the invention, when the glass cracks or breaks, the valves 14 and 17 are closed so that no water or steam can pass from the boiler thereto. By drawing the valve head 18 away from the seat 32, the beveled end of the head will seat against the seat 20, thus stopping the flow of water from the boiler through the chamber 19 and the passage 22. The passage 22, however, is now open so that the water in the glass 11 may quickly run down through the passage and out to the ground. By reason of the fact that there is no water left in the glass 11, the engineer will not have any reason to assume that he has sufficient water in the boiler to permit him to run his engine for any distance. Thus all danger of explosions is completely obviated.

Furthermore, the broken glass can be removed and a new one set in without danger of injury by escaping steam, as the valve head 18 completely stops the escape of hot water from the boiler, while the upper valve prevents any steam entering the glass.

A specially important feature of the above-described invention lies in the particular arrangement of the valve head 18 and its seats, with respect to the passage 22 which forms the drain. It will be noted that when the valve head 18 is moved into position to engage its seat 20, the passage 22 is free and uninterrupted and that there is a straight vertical drain passage from the bottom of the glass. The special advantage of this structure is that by it, the chance of clogging of the drain by accumulating scale is greatly reduced, if not entirely obviated. Furthermore, it is to be observed that the structure obviates the passing of drained water through any valve seat, the valve head 18 being and performing the function of a plug valve when it is in position to close the passage 22.

What is claimed is:

A valve for steam boiler water gauge glasses comprising a casing having a vertical drain passage therethrough positioned to communicate with the interior of a gauge glass connected with the valve, at the bottom of said glass, and a valve movable into position to close the said passage, said casing having a passage communicating with the first-named passage between the point of closure of the said first-named passage by the valve and the point of communication of the said first-named passage with a gauge glass connected to the casing, said valve being movable into position to close the second-named passage when it is moved from its first-named closing position.

In testimony whereof, I affix my signature.

BERNARD C. RODENHIZER.